Jan. 28, 1964     J. R. BROOKS     3,119,220
ELECTRIC GRASS TRIMMER AND EDGER
Filed April 11, 1962     2 Sheets-Sheet 1
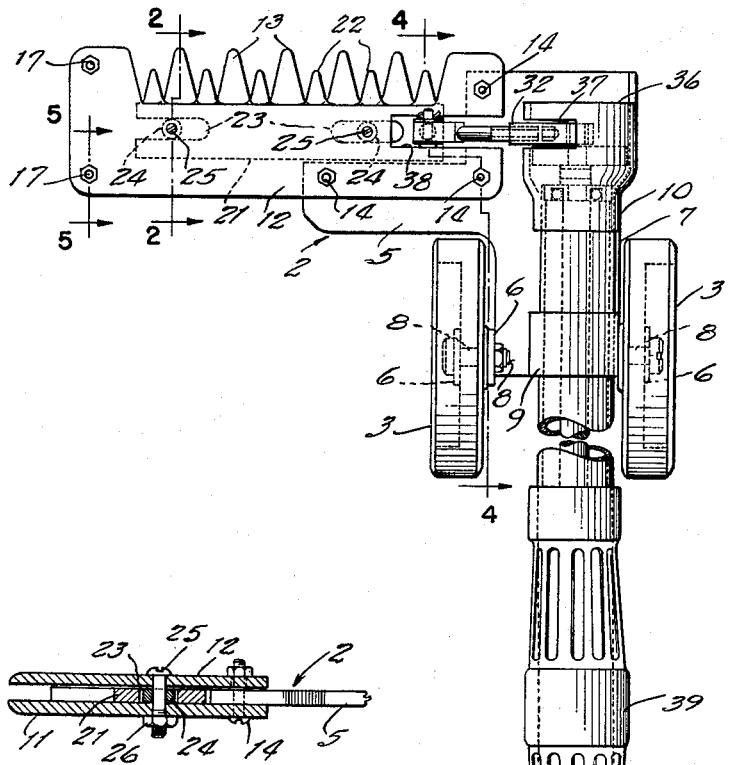
Fig. 2
Fig. 1
*INVENTOR.*
Jerry R. Brooks
BY
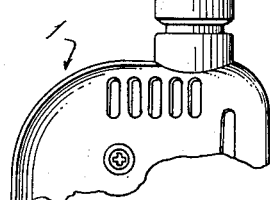
*ATTORNEY*

Jan. 28, 1964     J. R. BROOKS     3,119,220
ELECTRIC GRASS TRIMMER AND EDGER
Filed April 11, 1962     2 Sheets-Sheet 2

INVENTOR.
Jerry R. Brooks
BY
*Cecil L. Wood*
ATTORNEY

United States Patent Office 3,119,220
Patented Jan. 28, 1964

3,119,220
ELECTRIC GRASS TRIMMER AND EDGER
Jerry R. Brooks, 1716 Merrywood, Gainesville, Tex.
Filed Apr. 11, 1962, Ser. No. 186,802
1 Claim. (Cl. 56—26.5)

This invention relates to an electric grass trimmer and edger, and it concerns more particularly an electrically driven tool, for use either as a grass trimmer or as an edger, which in one form thereof comprises an attachment for an electric hand drill which provides a convenient source of power as well as a handle therefor.

The invention contemplates a light weight tool for the purpose described having a wheeled frame including a base plate which provides a support for laterally extending, mutually coacting blade elements, one of which is rigidly connected to the base plate, which in turn is supported on a pair of wheels, and the other of which is movable reciprocally in a lateral direction relative to said one of the blade elements, the frame further including an elongated torque tube rigidly connected at one end to the base plate and having a rotating drive shaft journaled therein, the drive shaft being operatively connected at one end to the electric hand drill, or other like power source, and at its opposite end to crank means whereby reciprocating motion is imparted to the last mentioned blade element.

The invention further contemplates a combined grass trimmer and edger as described in which the torque tube serves as a second handle therefor and which may be supported on its wheels, in which position it is adapted for use as a grass trimmer, or alternatively, may be held in both hands whereby it may be readily maneuvered in any desired position for use as an edger.

An advantageous feature of the combined grass trimmer and edger of the invention is that it is adapted to be used interchangeably either as a trimmer or as an edger without alteration or adjustment thereof.

The invention will be readily understood by referring to the following description and the accompanying drawing, in which:

FIGURE 1 is a top plan view of a combined grass trimmer and edger embodying the invention, showing the tool as it appears when supported on its wheels in position for use as a trimmer.

FIGURE 2 is a fragmentary sectional elevational view on an enlarged scale taken on the line 2—2 of FIGURE 1.

FIGURE 5 is a fragmentary sectional elevational view on an enlarged scale taken on the line 5—5 of FIGURE 1.

Figure 3:
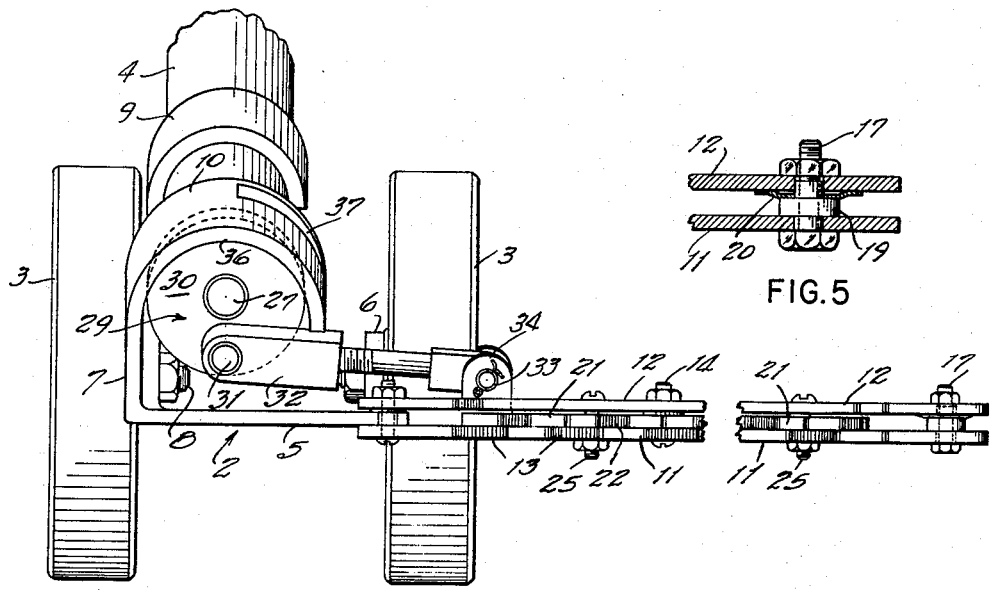
FIGURE 3 is a fragmentary front elevational view on an enlarged scale.

Referring to the drawing, the combined grass trimmer and edger of the invention is driven by a conventional electric hand drill, designated generally by the numeral 1, which is shown fragmentarily in FIGURE 1. The tool forms an attachment for the hand drill 1, which provides a source of power as well as a handle therefor.

The tool has a wheeled frame including a shaped base plate as hereinafter described, indicated generally by the numeral 2, which is supported on a pair of wheels 3, and an elongated torque tube 4 which is rigidly connected at one end to the base plate 2.

Figure 4:
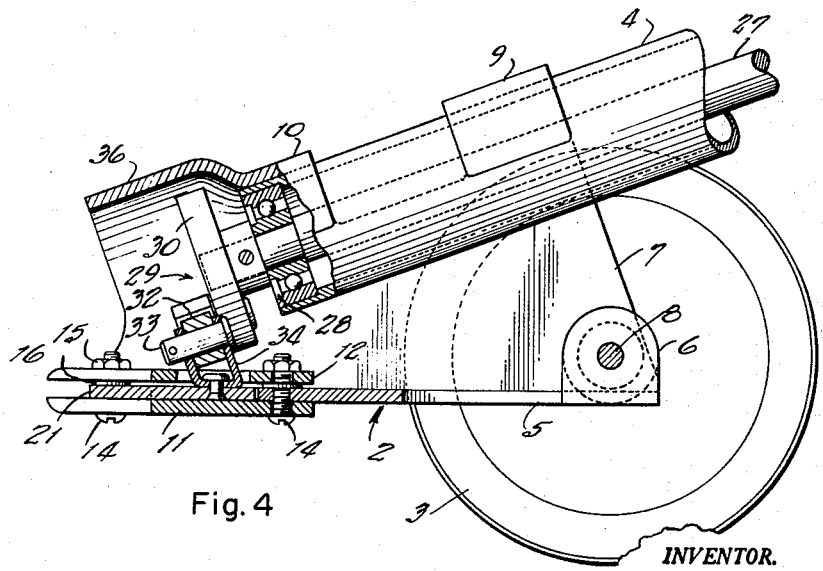
FIGURE 4 is a fragmentary sectional elevational view on an enlarged scale taken on the line 4—4 of FIGURE 1.

The base plate 2 has a planar bottom portion 5 which is disposed parallel to the ground in one operative position of the tool, as shown in FIGURES 3 and 4, and has an upstanding ear 6 and an upstanding web portion 7 on opposite sides thereof. The ear 6 and the web portion 7 have mutually aligned openings therein through which stub axles 8 are passed. The wheels 3 are journaled on the stub axles 8.

A pair of tabs 9, 10, which comprise upward extensions on each end of the web portion 7 of the base plate 2, are curved inwardly and over the latter whereby the torque tube 4 is rigidly secured to the base plate 2, the member 10 extending beyond the end of the torque tube 4. The torque tube 4 is inclined upwardly and rearwardly relative to the bottom portion 5 of the base plate 2, as shown in FIGURE 4.

The bottom portion 5 of the base plate 2 extends forwardly and laterally beyond the wheels 3, as shown in FIGURE 1, and has rigidly secured to opposite sides thereof, in parallel, spaced apart relation to each other, the adjacent ends of a fixed bottom blade element 11 and an elongated top plate 12, which extend laterally outwardly beyond the base plate 2. The bottom blade element 11 has longitudinally spaced teeth 13 extending forwardly from its leading edge for use as hereinafter described.

As shown in FIGURES 1 and 4, the bottom blade element 11 and the top plate 12 are rigidly connected to each other and to the bottom portion 5 of the base plate 2 by bolts 14 which are tapped in the base plate 2 and passed through corresponding openings in the fixed bottom blade element 11 and the top plate 12. The bolts 14 have nuts 15 applied thereto, and have spring washers 16 thereon between the base plate 2 and the top plate 12.

As shown in FIGURES 1 and 5, the ends of the bottom blade element 11 and the top plate 12 opposite the base plate 2 are connected in spaced apart relation to each other by bolts 17 which have nuts 18 applied thereto, and have spacer bushings 19 and spring washers 20 thereon between the bottom blade element 11 and the top plate 12.

An upper blade element 21 is arranged parallel to and between the bottom blade element and the top plate 12, in spring-tensioned, self-sharpening, sliding relation to the bottom blade element 11, and is movable reciprocally longitudinally thereof, in a lateral direction relative to the base plate 2. The upper blade element 21 has longitudinally spaced teeth 22 extending forwardly from its leading edge which coact with the teeth 13 of the bottom blade element 11 to gather the grass in the path of the tool and cut it as the tool is advanced relative thereto.

As shown in FIGURES 1 and 2, the upper blade element 21 has longitudinal slots 23 therein for engagement by guide bushings 24, which are journaled on shoulder screws 25 whereby they are secured between the bottom blade element 11 and the top plate 12, to thereby align the upper blade element 21 with the bottom blade element 11 and the top plate 12. The shoulder screws 25 have nuts 26 applied thereto.

A rotating drive shaft 27, which is arranged co-axially of the torque tube 4 and extends longitudinally outwardly beyond the ends thereof, is journaled in opposite ends of the torque tube 4 by means of bearings 28. One end of the drive shaft 27 is operatively connected to the hand drill 1 and the opposite end thereof is connected by crank means as hereinafter described, indicated generally by the numeral 29, to the adjacent end of the upper blade element 21 whereby a reciprocating motion is imparted thereto.

The crank means 29 includes a wheel 30 which is rigidly connected to the drive shaft 27 and has a pin 31 positioned eccentrically thereof for engagement by one end of a pitman 32 which is connected at its opposite end by a pin 33 to an upstanding yoke 34 secured to the upper blade element 21 by a rivet 35.

A shield 36, which comprises a forward extension of the tab 10, is provided for the protection of the crank means 29. The shield 36 has a slot 37 therein for engagement by the pitman 32, and a corresponding slot 38 is provided in the top plate 12 for engagement by the yoke 34.

A hand grip 39 is applied to the torque tube 4 intermediate its ends.

The invention may be modified in various ways without departing from the spirit and scope thereof.

What is claimed is:

In a grass trimmer and edger having a reciprocating cycle type cutting element, in combination, a base plate having a planar portion formed with a right-angular web along one side, an ear integrally formed on said base plate opposite said web and having its planar surfaces parallel thereto, a wheel on each side of said base plate and mounted on stub axles, arranged through apertures in said web and said lug, a reciprocable cutter blade attached to said base plate and extending therefrom opposite said right-angular web, a torque tube providing a handle for said base plate and said cutter blade and having a shaft coaxially thereof, the said shaft having a crank element on one end for actuating said cutting blade and means on its opposite end for attaching an electric motor, the said web having extended portions on each end embracing said torque tube whereby the latter is integrally secured to said base plate, one of said extended portions providing an enclosure for said crank element beyond the end of said torque tube and said shaft.

References Cited in the file of this patent
UNITED STATES PATENTS

| | | |
|---|---|---|
| 2,712,719 | Martin | July 12, 1955 |
| 2,863,274 | Kelsey | Dec. 9, 1958 |